United States Patent
Branch (10) Patent No.: US 10,391,687 B2
(45) Date of Patent: *Aug. 27, 2019

(54) DEEP DRAWN MICROCELLULARLY FOAMED POLYMERIC CONTAINERS MADE VIA SOLID-STATE GAS IMPREGNATION THERMOFORMING

(71) Applicant: DART CONTAINER CORPORATION, Mason, MI (US)

(72) Inventor: Gregory L. Branch, Camano Island, WA (US)

(73) Assignee: Dart Container Corporation, Mason, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,994

(22) Filed: Aug. 21, 2017

(65) Prior Publication Data

US 2017/0341281 A1    Nov. 30, 2017

Related U.S. Application Data

(60) Division of application No. 14/091,100, filed on Nov. 26, 2013, now Pat. No. 9,770,854, which is a
(Continued)

(30) Foreign Application Priority Data

May 14, 2004    (WO) ................ PCT/US2004/015246

(51) Int. Cl.
*B29C 44/06* (2006.01)
*B65D 81/38* (2006.01)
(Continued)

(52) U.S. Cl.
CPC .......... *B29C 44/3453* (2013.01); *B29B 11/14* (2013.01); *B29C 44/04* (2013.01);
(Continued)

(58) Field of Classification Search
CPC . B29C 44/04; B29C 44/0415; B29C 44/0461; B29C 44/0484; B29C 44/06
(Continued)

(56) References Cited

U.S. PATENT DOCUMENTS 1,948,568 A    2/1934 Faber
2,224,997 A    12/1940 Weisse
(Continued)

FOREIGN PATENT DOCUMENTS

CA    2012985 A1    9/1991
EP    0329490 A2    8/1989
(Continued)

OTHER PUBLICATIONS

Wang, "Solvent-free Fabrication of Porous Polymer for Tissue Engineering Applications," University of Washington, Dept. of Mechanical Engineering (dissertation), 2007.
(Continued)

*Primary Examiner* — Atul P. Khare
(74) *Attorney, Agent, or Firm* — McGarry Bair PC (57) ABSTRACT

The present invention is directed to a deep draw microcellularly foamed polymeric container comprising a polymeric sidewall integrally connected to a polymeric base along a bottom edge. The polymeric sidewall and base are contiguous with each other and define a shape of an open top container. The polymeric sidewall and base have a contiguous inner microcellular foam structure (having average cell diameters ranging from about 5 to about 100 microns) surrounded by a smooth outer skin layer integrally connected therewith. The polymeric sidewall defines a container height and a top opening, wherein the top opening defines a top opening width, and wherein the polymeric base defines a container base width, and wherein the area defined by the top opening is greater than the area defined by the polymeric
(Continued)

base, and wherein the ratio of the container height (h) to the top opening width (w) is greater than about 1:1 (h:w).

20 Claims, 5 Drawing Sheets

Related U.S. Application Data continuation of application No. 12/720,166, filed on Mar. 9, 2010, now Pat. No. 9,296,126, which is a continuation-in-part of application No. 11/106,190, filed on Apr. 13, 2005, now abandoned, which is a continuation of application No. PCT/US2004/015246, filed on May 14, 2004.

(60) Provisional application No. 60/471,477, filed on May 17, 2003.

(51) Int. Cl.
*B29C 44/34* (2006.01)
*B29C 44/04* (2006.01)
*B29B 11/14* (2006.01)
*C08J 9/12* (2006.01)

(52) U.S. Cl.
CPC ...... *B29C 44/0415* (2013.01); *B29C 44/0461* (2013.01); *B29C 44/0484* (2013.01); *B29C 44/06* (2013.01); *B29C 44/3446* (2013.01); *B65D 81/3867* (2013.01); *B65D 81/3874* (2013.01); *C08J 9/122* (2013.01); *C08J 2201/032* (2013.01)

(58) Field of Classification Search
USPC .......................................................... 264/51
See application file for complete search history.

(56) References Cited

U.S. PATENT DOCUMENTS

| | | |
|---|---|---|
| 2,317,448 A | 4/1943 | Dreyfus |
| 2,629,312 A | 2/1953 | Davis |
| 2,755,029 A | 7/1956 | Speed et al. |
| 2,917,217 A | 12/1959 | Sisson |
| 3,217,845 A | 11/1965 | Reynolds et al. |
| 3,244,537 A | 4/1966 | Cease |
| 3,260,781 A | 7/1966 | Lux |
| 3,364,519 A | 1/1968 | Pitsch |
| 3,557,265 A | 1/1971 | Chrisholm |
| 3,610,000 A | 10/1971 | Lopata |
| 3,617,311 A | 11/1971 | Beltle |
| 3,744,402 A | 7/1973 | Piegza |
| 3,803,332 A | 4/1974 | Sieferth |
| 3,836,624 A | 9/1974 | Ferris |
| 3,845,915 A | 11/1974 | Schmidt et al. |
| 3,846,526 A | 11/1974 | Wade |
| 3,883,625 A | 5/1975 | Thomas |
| 3,895,911 A | 7/1975 | Prins |
| 3,923,556 A | 12/1975 | Iszczukiewicz |
| 3,937,777 A | 2/1976 | Wienand |
| 3,955,482 A | 5/1976 | Moen |
| 3,978,260 A | 8/1976 | Dobbins et al. |
| 4,003,184 A | 1/1977 | Shiu |
| 4,003,302 A | 1/1977 | Mencacci |
| 4,059,660 A | 11/1977 | Roth et al. |
| 4,074,941 A | 2/1978 | Jablonski |
| 4,188,432 A | 2/1980 | Holden |
| 4,284,596 A | 8/1981 | Inokuchi |
| 4,304,747 A | 12/1981 | Lake |
| 4,335,606 A | 6/1982 | Saulsbury |
| 4,386,188 A | 5/1983 | Grancio |
| 4,424,287 A | 1/1984 | Johnson |
| 4,456,571 A | 6/1984 | Johnson |
| 4,473,665 A | 9/1984 | Martini-Vvedensky |
| D277,632 S | 2/1985 | Staufenberg |
| 4,511,520 A | 4/1985 | Bowen |
| 4,552,789 A | 11/1985 | Winchell |
| 4,608,009 A | 8/1986 | Whiteside |
| 4,616,991 A | 10/1986 | Bach et al. |
| 4,632,862 A | 12/1986 | Mullen et al. |
| 4,673,695 A | 6/1987 | Aubert |
| 4,693,856 A | 9/1987 | Rubens |
| 4,728,559 A | 3/1988 | Hardenbrook et al. |
| 4,756,091 A | 7/1988 | Van Denend |
| 4,761,256 A | 8/1988 | Hardenbrook |
| 4,848,543 A | 7/1989 | Doboze |
| 4,886,563 A | 12/1989 | Bennett |
| 4,894,248 A | 1/1990 | Pappas |
| 4,911,869 A | 3/1990 | Meyer |
| 4,981,631 A | 1/1991 | Cheung |
| 5,047,280 A | 9/1991 | Bach |
| 5,128,202 A | 7/1992 | Subramanian |
| 5,145,107 A | 9/1992 | Silver |
| 5,158,986 A | 10/1992 | Cha |
| 5,160,674 A | 11/1992 | Colton |
| 5,172,443 A | 12/1992 | Christ |
| 5,182,307 A | 1/1993 | Kumar |
| 5,207,008 A | 5/1993 | Wimberger |
| 5,217,660 A | 6/1993 | Howard |
| 5,223,545 A | 6/1993 | Kumar |
| 5,303,484 A | 4/1994 | Hagen |
| 5,334,356 A | 8/1994 | Baldwin |
| 5,360,829 A | 11/1994 | Kawabe |
| 5,362,436 A | 11/1994 | Wagner |
| 5,364,696 A | 11/1994 | Wagner |
| 5,369,135 A | 11/1994 | Campbell |
| 5,437,846 A | 8/1995 | Roumagnac |
| 5,484,640 A | 1/1996 | Mullen et al. |
| 5,589,243 A | 12/1996 | Day |
| 5,640,784 A | 6/1997 | Rochelau |
| 5,684,055 A | 11/1997 | Kumar |
| 5,723,510 A | 3/1998 | Kabumoto |
| 5,747,085 A | 5/1998 | Veltman |
| 5,783,610 A | 7/1998 | Fukushima |
| 2,792,295 A | 8/1998 | Huebmer |
| 5,792,295 A | 8/1998 | Huebner |
| 5,835,657 A | 11/1998 | Suarez |
| 5,844,731 A | 12/1998 | Kabumoto |
| 5,846,582 A | 12/1998 | Mayfield |
| 5,867,920 A | 2/1999 | Rogne |
| 5,894,046 A | 4/1999 | Kim |
| 5,904,946 A | 5/1999 | Kemp |
| 5,955,014 A | 9/1999 | Raukola |
| 6,012,583 A | 1/2000 | Ramirez |
| 6,025,049 A | 2/2000 | Ouellette et al. |
| 6,074,678 A | 6/2000 | Blackwelder |
| 6,080,798 A | 6/2000 | Handa et al. |
| 6,083,580 A | 7/2000 | Finestone et al. |
| 6,102,313 A | 8/2000 | Salzsauler |
| 6,235,380 B1 | 5/2001 | Tupil |
| 6,365,249 B1 | 1/2002 | Al Ghatta |
| 6,403,663 B1 | 6/2002 | Desimone |
| 6,503,427 B1 | 1/2003 | Yamamoto et al. |
| D476,861 S | 7/2003 | Zettle |
| 6,656,671 B1 | 12/2003 | Aylward |
| 6,773,791 B1 | 8/2004 | Ruggie et al. |
| 6,884,377 B1 | 4/2005 | Bernham |
| 6,884,823 B1 | 4/2005 | Pierick |
| 6,948,378 B2 | 9/2005 | Solberg |
| 6,979,494 B2 | 12/2005 | Berrier et al. |
| 7,041,187 B2 | 5/2006 | Park et al. |
| 7,083,849 B1 | 8/2006 | Albrecht |
| 7,364,659 B2 | 4/2008 | Jang |
| 7,501,175 B2 | 3/2009 | Branch |
| 7,585,439 B2 | 9/2009 | Branch |
| 7,699,216 B2 | 4/2010 | Smith |
| 7,807,260 B2 | 10/2010 | Nadella |
| 8,076,616 B2 | 12/2011 | Stanger |
| 2001/0020513 A1 | 9/2001 | Tupil |
| 2001/0032903 A1 | 10/2001 | Durrance |
| 2002/0168509 A1 | 11/2002 | Desimone |
| 2003/0130364 A1 | 7/2003 | Vo |
| 2003/0138570 A1 | 7/2003 | Kaylor et al. |

(56) References Cited

U.S. PATENT DOCUMENTS

| | | | |
|---|---|---|---|
| 2004/0005449 | A1 | 1/2004 | Sugimoto |
| 2004/0250628 | A1 | 12/2004 | Solberg |
| 2005/0214512 | A1 | 1/2005 | Fascio |
| 2005/0035495 | A1 | 2/2005 | Baker |
| 2005/0058824 | A1 | 3/2005 | Fujimoto |
| 2005/0181196 | A1 | 8/2005 | Aylward |
| 2005/0203198 | A1 | 9/2005 | Branch |
| 2006/0073298 | A1 | 4/2006 | Hutchinson |
| 2006/0144915 | A1 | 7/2006 | Sadlier |
| 2006/0257606 | A1 | 11/2006 | Branch |
| 2006/0284331 | A1 | 12/2006 | Branch |
| 2007/0148432 | A1 | 6/2007 | Baker et al. |
| 2008/0087715 | A1 | 4/2008 | Robertson |
| 2008/0274346 | A1 | 11/2008 | Miller |
| 2008/0277817 | A1 | 11/2008 | Miller |
| 2008/0280123 | A1 | 11/2008 | Miller |
| 2009/0035596 | A1 | 2/2009 | Higashi |
| 2009/0065136 | A1 | 3/2009 | Nadella |
| 2009/0104420 | A1 | 4/2009 | Nadella |
| 2010/0028654 | A1 | 2/2010 | Takase |
| 2010/0062235 | A1 | 3/2010 | Nadella et al. |
| 2011/0081524 | A1 | 4/2011 | Nadella |

FOREIGN PATENT DOCUMENTS

| | | | | |
|---|---|---|---|---|
| EP | 0371392 | A2 | 6/1990 | |
| EP | 1055499 | A1 | 11/2000 | |
| EP | 1636008 | A2 | 3/2006 | |
| EP | 2153982 | | 2/2010 | |
| GB | 2044672 | A | 10/1980 | |
| JP | 11080408 | A | 3/1993 | |
| JP | 08174646 | | 7/1996 | |
| JP | 08174646 | A * | 7/1996 | |
| JP | 08174646 | A | 7/1996 | |
| JP | 11080408 | | 3/1999 | |
| JP | 11080408 | A * | 3/1999 | ......... B29C 44/3453 |
| JP | 11170288 | | 6/1999 | |
| WO | 9618486 | A2 | 6/1996 | |
| WO | 9721377 | A2 | 6/1997 | |
| WO | 200105574 | | 1/2001 | |
| WO | 200136521 | | 5/2001 | |
| WO | 04103828 | A2 | 12/2004 | |
| WO | 2004103675 | A1 | 12/2004 | |
| WO | 2004104072 | A2 | 12/2004 | |
| WO | 2009036328 | | 3/2009 | |

OTHER PUBLICATIONS

Kumar, "A model for the unfoamed skin on microcellular foams", 1994, Polymer Engineering & Science 34(3) pp. 169-173.

Holl, "A steady-state mass balance model of the polycarbonate C02 System", 2001, Journal of Polymer Science Part B, vol. 39 p. 868-880.

Kumar, "A process for making thermoplastic parts", 1990, 30(20), Polymer Engineering and Science, Oct. 1990, p. 1323-1329.

Kumar, "Semi-continuous production of solid state PET foams," Society of Plastics Engineers Conference Proceedings, 1995, vol. II, pp. 2189-2192.

Zhang, "An in situ study of plasticization of polymers by high-pressure gases", 1998, Journal of Polymer Science Part A: polymer chemistry 36(6) p. 977-982.

Arora et al, "Preparation and characterization of microcellular polystyrene foams processed in supercritical carbon dioxide," Macromolecules 31, p. 4614-4620 (1998).

Yousefpour, "Fusion bonding/welding of thermoplastic composites", Journal of Thermoplastic Composite Materials Jul. 2004 vol. 17 No. 4 303-341.

Goel, "Generation of Microcellular Polymers using Supercritical C02", Cellular Polymers: Heriot-Watt University, Mar. 23-25, 1993, 1993: p. 25.

Seeler, "Net-shape sintered microcellular foam parts, SPE Technical Papers", vol. XLIII, 1997, pp. 2032-2036.

Young, "Polymer-Solvent Phase Separation as a Route to Low Density, Microcellular Plastic Foams", Journal of Cellular Plastics, 1987 23(1 ): p. 55.

Wang et al., "A method for solvent-free fabrication of porous polymer using solid-state foaming and ultrasound and tissue engineering applications," Biomaterials 27 (2006).

Mehta et al, "Prediction of Density Variation in Thick Microcellular Sheets," UW ME Course Project Report Autumn 2003.

Nadella et al, "Prediction of Density Variation in Thick Microcellular Sheets," ANTEC 2004, p. 2610-2614.

International Search Report for application No. PCT/US04/015246 dated Oct. 19, 2004.

American Chemistry Council, "2009 United States National Post-Consumer Plastic Bottle Recycling Report," APPR (2010).

International Search Report PCT/US2014/011534 dated May 12, 2014.

\* cited by examiner

DEEP DRAWN MICROCELLULARLY FOAMED POLYMERIC CONTAINERS MADE VIA SOLID-STATE GAS IMPREGNATION THERMOFORMING

CROSS-REFERENCE TO RELATED APPLICATIONS

This application is a division of U.S. application Ser. No. 14/091,100, filed on Nov. 26, 2013, now U.S. Pat. No. 9,770,854, issued Sep. 26, 2017, which application is a continuation of U.S. application Ser. No. 12/720,166, filed on Mar. 9, 2010, now U.S. Pat. No. 9,296,126, issued Mar. 29, 2016, which application is a continuation-in-part of U.S. application Ser. No. 11/106,190, filed on Apr. 13, 2005 (abandoned), which application is a continuation of PCT International Application No. PCT/US2004/015246 filed on May 14, 2004, which application claims the benefit of priority to U.S. Provisional Application No. 60/471,477 filed on May 17, 2003, all of which applications are incorporated herein by reference in their entireties for all purposes.

TECHNICAL FIELD

The present invention relates generally to foamed polymeric objects and, more specifically, to deep drawn microcellularly foamed polymeric containers made via solid-state gas impregnation thermoforming, as well as to related methods.

BACKGROUND OF THE INVENTION

Microcellular plastic foam refers to a polymer that has been specially foamed so as to create micro-pores or cells (also sometime referred to as bubbles). The common definition includes foams having an average cell size on the order of 10 microns in diameter, and typically ranging from about 0.1 to about 100 microns in diameter. In comparison, conventional plastic foams typically have an average cell diameter ranging from about 100 to 500 microns. Because the cells of microcellular plastic foams are so small, to the casual observer these specialty foams generally retain the appearance of a solid plastic.

Microcellular plastic foams can be used in many applications such as, for example, insulation, packaging, structures, and filters (D. Klempner and K. C. Fritsch, eds., *Handbook of Polymeric Foams and Foam Technology*, Hanser Publishers, Munich (1991)). Microcellular plastic foams have many unique characteristics. Specifically, they offer superior mechanical, electrical, and thermal properties at reduced material weights and costs.

The process of making microcellular plastic foams has been developed based on a thermodynamic instability causing cell nucleation (J. E. Martini, SM Thesis, Department of Mech. Eng., MIT, Cambridge, Mass. (1981)). First, a polymer is saturated with a volatile foaming agent at a high pressure. Then, by means of a rapid pressure drop, the solubility of foaming agent impregnated within the polymer is decreased, and the polymer becomes supersaturated. The system is heated to soften the polymer matrix and a large number of cells are nucleated. The foaming agent diffuses both outwards and into a large number of small cells. Stated somewhat differently, microcellular plastic foam may be produced by saturating a polymer with a gas or supercritical fluid and using a thermodynamic instability, typically a rapid pressure drop, to generate billions of cells per cubic centimeter (i.e., bubble density of greater than 108 cells per cubic centimeter) within the polymer matrix.

U.S. Pat. No. 4,473,665 to Martini-Vvedensky et al., is directed to a two-stage method for foaming thermoplastics. That patent describes a first stage wherein a polymer is placed in a pressure vessel for saturation with high-pressure gas. During a second stage, the polymer is heated to the $T_g$ at a much-reduced pressure. The gas, previously forced into the polymer at high-pressure, foams the polymer when the polymer temperature reaches a temperature that sufficiently softens the plastic.

U.S. Pat. No. 5,684,055 to Kumar et al. discloses a method for the semi-continuous production of microcellular foam articles. In a preferred embodiment, a roll of polymeric sheet is interleaved with a gas channeling means (e.g., porous paper, gauze, mesh, woven and non-woven fabrics) to yield an interleaved cylindrical roll. The interleaved roll is exposed to a non-reacting gas at elevated pressure for a period of time sufficient to achieve a desired concentration of gas within the polymer. The saturated polymer sheet is then separated from the gas channeling means and bubble nucleation and growth is initiated by heating the polymeric sheet. After foaming, bubble nucleation and growth is "quenched" by rapidly cooling the foamed polymeric sheet. The '055 patent is entirely silent with respect to how a foamed polymeric sheet is to be subsequently shaped into an article of manufacture.

For years, customers and food vendors searched for a disposable coffee cup that was not too hot to hold, would keep the coffee warm, and did not contaminate the coffee or our planet. Even though they appreciated their insulating quality, consumers rejected PS (polystyrene) foam cups as too polluting and unhealthy. Major coffee vendors have used an additional costly insulating sleeve to satisfy their customers. Many food-packaging products call for the insulating qualities of foam without the hazards of PS foam.

Thermoforming is a conventional method for forming three dimensional shapes from flat polymer sheets. The process heat softens the flat polymer sheet and then vacuum or pressure forms the sheet onto a die with the required shape. Thermoforming produces general packaging as well as PS Foam Clamshells and solid plastic cups. When thermoforming is used to form a deep product such as a coffee cup, etc. from a flat plastic or foamed sheet, it is termed a deep draw.

As is understood by those of skill in the art, thermoforming in general refers to a set of related processes for producing shaped articles of thermoplastic. Included in thermoforming are the processes of vacuum forming, pressure assisted thermoforming, high definition thermoforming, drape forming, press forming and line bending.

While advances have been made in the field of thermoformed-foamed polymers, there remains a need for improved products and methods related to the manufacture of such products. The present invention fulfills these needs and provides for further related advantages.

SUMMARY OF THE INVENTION

Aspects of the present disclosure relate to a method for forming a thermoplastic material into a desired shape. Aspects of the method include increasing the thermoplastic material's degree of crystallinity by infusing the thermoplastic material with a gas for a period and allowing, for a period, gas infused into the thermoplastic material to migrate out of the material. Bubbles are nucleated in the gas-infused thermoplastic material by causing the gas-infused thermoplastic material to reach a temperature that is at least the glass-transition-temperature of the gas-infused thermoplastic material. The temperature that is at least the glass-transition-temperature of the gas-infused thermoplastic material is held for a period to allow the bubbles to grow in size. The temperature of the gas-infused thermoplastic material is then reduced to stop the bubbles from growing in size. The thermoplastic material is thermoformed into a shape.

These and other aspects of the will become more evident upon reference to the following detailed description and attached drawings. It is to be understood, however, that various changes, alterations, and substitutions may be made to the specific embodiments disclosed herein without departing from their essential spirit and scope.

DETAILED DESCRIPTION OF THE INVENTION

The present invention is directed to deep drawn microcellularly foamed polymeric containers, as well as to methods of making the same. In the several embodiments disclosed herein, the deep drawn microcellularly foamed polymeric containers are described in the context of transforming a solid monolithic sheet of a PET (polyethylene terephthalate) thermoplastic material; however, it is to be understood that other semi-crystalline polymers such as, for example, PEEK (polyetheretherketone), PEN (polyethylene naphthalate), PBT (polybutylene terephthalate), PMMA (polymethyl methacrylate), and PLA (polylactide), as well as various polymeric blends thereof, are contemplated and within the scope of the invention. In addition, and as appreciated by those skilled in the art, PET is understood to be inclusive of both RPET (recycled polyethylene terephthalate) and CPET (crystallizing polyethylene terephthalate).

The present invention utilizes a solid state process of gas impregnation to enhance the performance of thermoplastic material used in thermoforming. A roll of polymer sheet is provided with a gas channeling means interleaved between the layers of polymer. The roll is exposed to a non-reacting gas at elevated pressure for a period of time sufficient to achieve an elevated concentration of high-pressure gas within the polymer. If the gas is a plasticizing gas, exposure is for a period of time required to bring about a plasticizing effect of the polymer. The saturated polymer sheet is then separated from the gas channeling means and decompressed and subsequently thermoformed. In embodiments utilizing plasticizing gas, the glass transition temperature of the exposed polymer is reduced, and therefore thermoforming may take place at a lower temperature than used for thermoforming unexposed polymer.

In some applications, the invention provides foaming the polymer prior to thermoforming by creating high levels of dissolved gas during gas exposure. In some embodiments practicing foaming, bubble nucleation and growth proceeds spontaneously upon decompression, while in other foamed embodiments bubble nucleation and growth is initiated and enhanced by heating the polymer sheet near to or above the polymer's glass transition temperature, thereby producing foamed polymer ready for immediate thermoforming. In embodiments practicing foaming, the processes of foaming and thermoforming may be continuous. In preferred embodiments practicing continuous foaming and thermoforming, foaming is performed by heating just prior to forming.

In another aspect, a method is provided for thermoforming foam semicrystalline polymers with control of the unfoamed skin thickness, independent control of the depth and percentage crystallinity of the surface layers, as well as the core percent crystallinity. This method also reduces energy consumption, increases quality, and significantly increases production rate of thermoformed polymer foams. This method uses high levels of gas-induced crystallinity prior to thermoforming and results in higher allowable service temperature limits. The reversible plasticizing imbued upon the thermoplastic by the foaming gas increases the allowable depth of draw during thermoforming.

In yet another aspect, a thermoformed semicrystalline-polymer material is taught, the material having an unfoamed skin of controllable thickness and percentage crystallinity as well as a foamed core with a lower percent crystallinity. The "gas-impregnated thermoformed" material allows higher formed part service temperatures than conventional through crystallized solid PET thermoformed parts with similar impact strength. Alternately, "gas-impregnated thermoformed" polymer allows higher formed part impact strength and ductility than conventional through crystallized solid PET thermoformed parts with similar maximum service temperature. Further, this material increases the practical depth of draw or the maximum practical crystallinity level for a given depth of draw during a thermoforming operation. Other semi-crystalline polymers experience similar benefits when thermoformed after being injected with crystallizing gas.

In still another aspect, a food-to-go container is fabricated from foamed thermoplastic, such as PET for example. The container, which may be used for consumer, food processors, and institutional applications, includes features for maintaining desirable properties of food such as freshness, crispness, crunchiness, heat, cold, etc. Additionally, the material may be formed to withstand relatively large swings in temperature including, for example, freezer-to-oven, refrigerator-to-microwave, etc. This allows consumers and institutions to use the packaging for processing, cooking, storage, reheating, serving, etc.

Although in principle many thermoplastic sheet materials may be converted into foamed containers according to the present invention, PET and partially crystalline PET (C-PET) are preferred for many of the containers and especially food containers described herein because those materials are especially desirable for, and recognized by the FDA for direct food contact. A desirable property of the process described herein is that the foaming agents reversibly plasticize the thermoplastic, enabling the use of C-PET throughout the process rather than requiring it to be formed in situ during finishing. In another aspect, the process allows higher degrees of crystallinity in the finished product, a property that generally increases hardness and thermal stability of the finished product. In another aspect, the process allows variable crystallinity through the section of products formed therefrom, thus enabling customization of material properties.

The polymeric materials noted above may be saturated by exposure to a gaseous working fluid under pressure. For example, PET or C-PET may be exposed to carbon dioxide at 250 to 2500 PSIG, and especially approximately 270 to 2430 PSIG. The high pressure causes carbon dioxide gas to soak into the plastic rolls. Once saturated with gas the plastic roll is removed from the pressure vessel and proceeds to step two of the process. With the working fluid thus forced into the polymer matrix, the material may be thought of as nascent foam. Because the working fluid, in preferred embodiments, does not react chemically with the thermoplastic material, the material is not chemically altered and thus may continue to be recycled. The working fluid does, however, reversibly plasticize the material, reducing its glass transition temperature, $T_g$, and making materials with normally high $T_g$ more amenable to processing.

After saturation and before expansion, the material may be held for a quiescent period of time. When held at a pressure and/or temperature lower than the pressure and temperature of the saturation step such as ambient temperature and atmospheric pressure for instance, the material is, in fact, supersaturated. During the quiescent period, which may be adjusted and may be accompanied by environmental changes such as pressure changes, temperature changes, etc. according to desired properties of the material, dissolved working fluid at the surfaces of the sheet escapes into the surrounding environment. In the case of a carbon dioxide working fluid, it is permissible to allow the escaped gas into the atmosphere or alternatively to be recycled. By allowing the surface working fluid to escape, the localized material at the surface is no longer a nascent foam and will not form a foam during subsequent processing. The thickness of the surface layer thus affected may be adjusted by adjusting the quiescent time or otherwise changing the environmental conditions. Longer times allow more gas to escape, resulting in thicker surface layers. The surface layers are useful for improving cosmetic appearance and for enhancing abrasion and cut resistance. Generally the quiescent period may last from 10-24 hours for example. Refrigeration of the material during the quiescent or "de-sorption" period can extend it for greater process flexibility.

Figure 1:
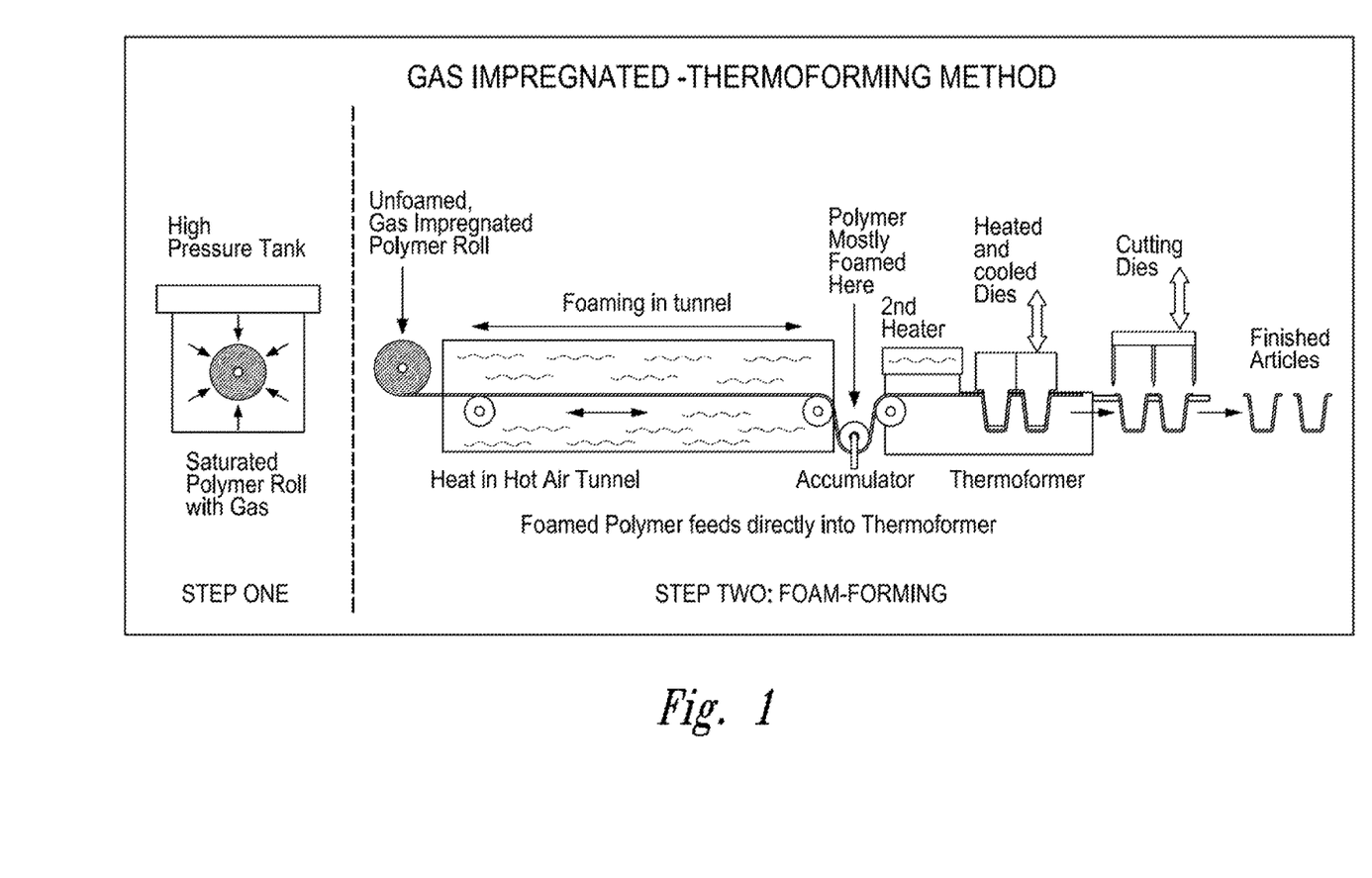
FIG. 1 is a schematic representation of a solid-state gas impregnation and thermoforming system useful for making deep drawn microcellularly foamed polymeric containers (from an interleaved gas impregnated polymeric roll) in accordance with an embodiment of the present invention.

The nascent foam is then expanded into a closed microcellular foam by expanding in the presence of heat during expansion. As depicted in FIG. 1, the gas-saturated plastic roll is unwound and as it is being unwound it is fed into a heating tunnel in which it is heated. The heat causes the plastic to soften and the absorbed gas in the plastic coalesces into billions of small bubbles. The plastic expands in volume while retaining a surface skin of unfoamed plastic. At the exit end of the tunnel the resulting foam looks completely solid and still is a flat sheet. When heated to near its $T_g$ the polymer matrix relaxes, thus allowing the high pressure dissolved working fluid to expand at the reduced pressure of the expansion apparatus. For PET, which has a $T_g$ of approximately 150° C., this may be done in a hot air tunnel, by surface contact, by radiation heat transfer under infrared emitters, in hot liquid, or using other methods known to the art.

By controlling the saturation time, pressure, and temperature in the first stage, heavily crystallized PET surface layers are formed before foaming. The second stage of that process, subsequent foaming with heat, does not foam the heavily crystallized layers. Once the desired skin depth is crystallized above a threshold percentage level (about 19% for PET) the skin will not foam during the subsequent foaming operation. This limits the depth of crystallinity level that has obtained 19% or more, to a thickness less than or equal the desired finished unfoamed skin thickness. The "desorb time" or quiescent period (elapsed time after removal from the high pressure tank until heating for foaming) may also control the depth of the unfoamed surface skin.

In the above-described process, a polymer sheet is first interleaved with a gas channeling means to form an interleaved roll, stack of sheets, or festoon of polymer and gas channel. Gas channeling means preferably consists of a layer of flexible gas permeable material. While porous paper sheet is a preferred material, other gas permeable materials, such as particulate material, gauze, mesh, and woven or nonwoven fabrics, may also be successfully employed in the present invention.

Interleaved material is next exposed under elevated pressure to a non-reacting gas which is soluble in the polymer for a time sufficient to achieve a desired concentration of gas within the polymer, typically at least 0.5% by weight for PET-CO2 systems. Exposure to pressure is generally carried out at room temperature (around 21 degrees C.). Higher temperatures may be employed to accelerate the rate of diffusion of the gas within the polymer, while lower temperatures may result in higher levels of gas saturation over time. The pressure can be varied above tank supply pressure with booster pumps. For example, the preferred tank pressure range when employing $CO_2$ is about 0.345 to 5.2 MPa. This can be increased to over 8.27 MPa with a suitable booster pump. Pressures as high as 17.2 MPa or higher (supercritical $CO_2$) are usable. The preferred gas can depend upon the polymer being treated. For example, carbon dioxide is the preferred gas for use in foaming PET, PVC and polycarbonate, while nitrogen is the preferred gas for use in foaming polystyrene. "Modified air", which is atmospheric air in which the percentage oxygen has been reduced to 1% to 20% by reverse osmosis under pressure, as well as pure atmospheric air, may alternatively be employed in some embodiments.

The amount of time during which the polymer roll is exposed to gas varies with the thickness of the solid polymer sheet, the specific polymer-gas system, the saturation pressure, and the diffusion rate into the polymer, and is generally determined experimentally. However, periods of between 3 and 100 hours are typically employed for sheet thicknesses of 0.25 mm to 2 mm. For example, when saturating a 0.5 mm. thick sheet of PET with $CO_2$, a saturation time of between about 15 to 30 hours is preferred.

Following saturation of the polymer-gas permeable material sheet, the sheet is returned to normal pressure and the gas channeling means removed, yielding a sheet of gas impregnated polymer exhibiting the plasticizing effect, which gradually reverses as the gas dissipates from the impregnated polymer.

In some embodiments, the impregnated plasticized polymer may be foamed prior to thermoforming, while in other embodiments unfoamed plasticized polymer is thermoformed directly. In other embodiments, the plasticized polymer may or may not be foamed during the heating step of thermoforming depending on gas saturation pressure, absorbed gas concentration level, and thermoforming temperature.

For optional foaming in some embodiments, on unwinding from the gas channel, the polymer sheet is heated above its glass transition temperature by drawing under tension through a heating station. The polymer sheet is thereby foamed in a continuous manner. After passing through the heating station, the polymer sheet may be drawn through a cooling station, such as a cold water bath, a set of chilled rollers or simply air, to cool the polymer and stop bubble nucleation and growth. In such embodiments, the temperature of the heating station as well as the rate at which the polymer sheet is drawn through the heating station and cooling station can be varied to provide sheets of varying bubble size and density. After foaming, the polymer sheet is trimmed, yielding finished foamed polymer material which may then be thermoformed.

While embodiments may practice foaming simultaneously with forming, such embodiments require additional forming time to allow the material to foam, and may therefore be less adaptable to high throughput production requirements. Preferred embodiments for high throughput production requirements employ a heating station to heat the saturated polymer to a temperature suitable for both foaming and thermoforming, and then immediately thermoform the material without need of a cooling station.

A surprising and significant result of foaming gas impregnated polymer according to the processes described above is that the micro-cells in the resulting polymer foam contain gas pressurized above atmospheric pressure. At thermoforming temperatures, the effect of the pressurized gas trapped in micro-cells is to create secondary expansion of the micro-cells, thereby keeping the cells from buckling or collapsing. Further, when the gas is plasticizing, the polymer at the cell walls is highly plasticized, enhancing the effective plasticization of the polymer yet further, thereby resulting in foamed polymers of lower viscosity than expected at a given temperature.

Either unfoamed impregnated polymer or gas impregnated foamed polymer may be thermoformed. As discussed earlier, the temperature required for thermoforming articles from plasticized gas impregnated material is generally lower and often significantly lower than for the same material without the plasticizing effect. For some gas/polymer systems in which the polymer is highly saturated with plasticizing gas, the polymer may be sufficiently plasticized that the material may be "thermoformed" at room temperature. Furthermore, because the viscosity of the polymer is lowered by the plasticizing effect, for a given thermoforming process, greater detail and deeper "draws" are possible when thermoforming the plasticized material than is possible with material that has not been plasticized. In some cases, such as vacuum forming with PET foam, articles may be thermoformed that cannot be thermoformed with polymer that has not been plasticized.

Referring now to FIG. 1, a roll of flat polymer stock with porous separator material between each roll layer (alternately a group of sheets with a separator between each sheet) is placed into a pressure vessel for saturation. The pressure vessel is filled with CO2 gas to allow the gas to saturate the polymer. The gas serves as a physical blowing agent. The gas also serves to lower the polymer $T_g$, the rigidity, and melting temperature. The saturation time in the pressure vessel is dependent upon pressure, the desired gas-to-solids ratio, the geometry of the roll, the thickness of the flat polymer stock, and other variables. For example, with $CO_2$ gas at 40 atmospheres pressure saturating PET at room temperature, a typical time in the pressure vessel is 190 hours. At this time, the surface crystallinity may be above a 19% threshold that restricts later foaming. Saturation time longer than this increasingly creates a deeper crystallization layer and also increases the percentage of crystallization at a given depth. Saturation pressures may range from 20 to 180 atmospheres or more.

While this description is exemplified with PET, it should be recognized that other polymers or mixtures of polymers may be used in place of or in addition to PET. Suitable gas-polymer systems include $CO_2$ and Polypropylene, as disclosed in $CO_2$-*Assisted Crystallization of Polypropylene for Increased Melting Temperature and Crystallinity* by Mitsuko Takada et al. Proceedings of Polymer Processing Society meeting, Hertogenbosh, Netherland, May 31, 1999. Other gases and pressures may be used (for example, $CO_2$ may be used with polyethylene, polyvinyl chloride, acrylonitrile butadiene styrene, polycarbonate, polyethylene terephthalate, and polypropylene; and N2 gas may be used with polystyrene). In preferred embodiments, the gas acts to reduce the $T_g$ or melt temperature of the polymer.

The gas impregnation of the polymer may take place either below or above the gas's supercritical pressure. Pressures as high as 180 atmospheres have been successfully used to foam polymers. Higher pressures result in a higher level of gas impregnation with a maximum of about 30% by weight of gas dissolved in the polymer.

By controlling the saturation time, pressure and temperature in the first stage, heavily crystallized PET surface layers are formed before foaming. The second stage of that process, subsequent foaming with heat, does not foam the heavily crystallized layers. Once the desired skin depth is crystallized above a threshold percentage level (about 19% for PET), the skin will not foam during the subsequent foaming operation. This limits the depth of crystallinity level that has obtained 19% or more, to a thickness less than or equal the desired finished unfoamed skin thickness. The "desorb time" or quiescent period (elapsed time after removal from the high pressure tank until heating for foaming) may also control the depth of the unfoamed surface skin.

Figure 5:
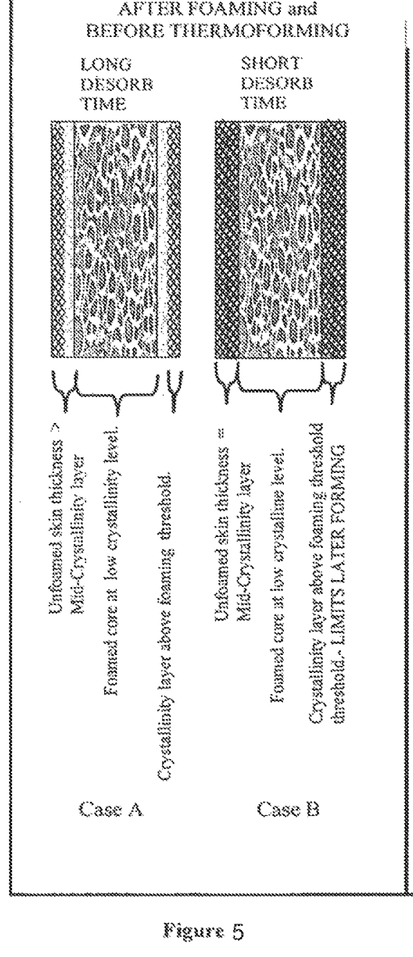
FIGS. 5 and 6 are cross-sections of polymer structures obtained before and after thermoforming when used with high levels of gas-induced crystallinity prior to thermoforming.
Figure 6:
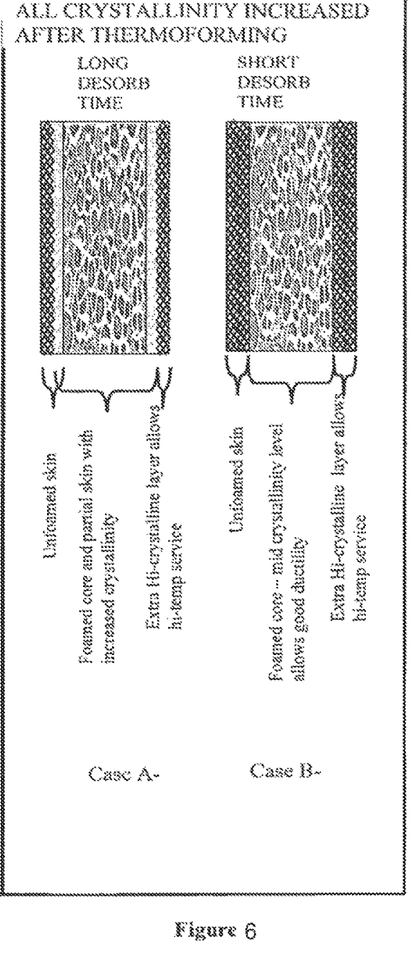
Figure 7:
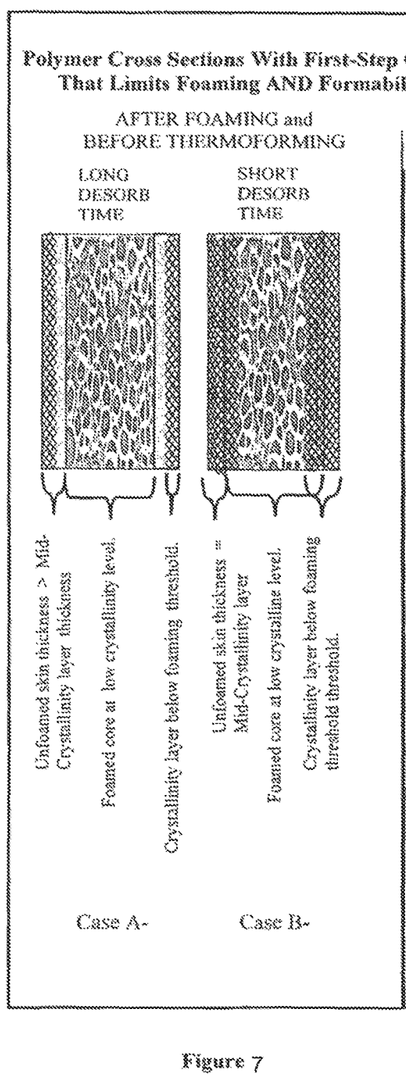
FIGS. 7 and 8 are cross-sections of polymer structures obtained before and after thermoforming when used with low levels of gas-induced crystallinity prior to thermoforming.

The term "skin" refers to the integral unfoamed polymer produced by the semi-continuous process without regard to the crystallinity levels. After foaming, a layered structure exists that includes two surface layers consisting of highly crystallized PET and an interior at a lower crystallinity level as illustrated in FIGS. 5 through 8. Immediately after foaming, the thickness of the surface unfoamed skins may be greater than the raised crystallinity level layer as illustrated in FIG. 5, Case A, or may be approximately equal in thickness, as illustrated by FIG. 5, Case B. This previously foamed sheet or roll stock may then be thermoformed in a conventional thermoformer during which all layers may have their crystallinity levels raised, as illustrated by FIG. 6, Cases A and B.

Crystallization also takes place during thermoforming heating and stretching operations depending on time, temperature and stress levels. Thermoforming crystallization takes place throughout the material thickness approximately uniformly. The biaxial stresses created during the forming operation can also increase the crystallization at a given temperature. U.S. Pat. No. 4,388,356 describes one method for "heat-setting" during a PET thermoforming operation (incorporated herein by reference).

A preferred method combines gas crystallization with thermoforming crystallization to create a controllable level of crystallinity in the surface layers and in the core, which may be different than that of the surface layers. For instance, the surface layer can be brought up to about 14% during foaming and then subsequently raised to 29% while the interior is raised from 0% to 15% during the thermoforming operation. This combination gives independent unfoamed surface layers.

Thermoforming a polymer above a threshold crystallinity level (19% crystallinity for PET without impregnated gas) before thermoforming severely limits formability. In addition, thermoforming a polymer and then raising its crystallinity level above threshold (19% crystallinity for PET) increases the formed part's usable service temperature and strength (see e.g. *Thermoforming, A Plastics Processing Guide*, G. Gruenwald, Technomic Publishing AG, $2^d$ Ed. 1998). It also makes the resultant part more brittle and subject to fracture at low impact.

Because of the reversible plasticizing effect of the impregnated gas described herein, crystallinity may be raised higher than the conventional process limit of 19%, while still maintaining sufficient ductility for thermoforming. After thermoforming, the gas gradually migrates out of the material, being replaced by ambient gas (e.g. air), thus reversing the plasticizing effect and imparting the material qualities normally associated with the higher crystallinity. Higher temperature stability is one such material quality that may be desirable depending upon application.

This method may provide a multi-level crystalline structure that can have a very high application temperature due to its greater than threshold level surface crystallinity while at the same time have increased ductility and impact resistance due to the lower level crystallinity in the foam core and the part of the unfoamed skin. This same principle applies to other gas-semi-crystalline polymer systems such as $CO_2$-polyropylene systems.

Another aspect of this process encompasses the use of thermoforming crystallization immediately after the foaming operation as described in U.S. Pat. No. 5,223,545 and before the majority of the foaming gas has been replaced by air. In a more specific embodiment illustrated in FIG. 1, an impregnated roll is fed continuously through a hot-air tunnel and foamed. Thence it feeds directly into an accumulator just ahead of the thermoformer and after most of the foaming has taken place. The accumulator allows continuous movement of the roll through the foaming section while the material feed stops and starts within the thermoformer with each thermoformer cycle (lasting typically 2 to 30 seconds). Alternatively, the roll may be stopped and started in the heating section with each thermoformer cycle thereby eliminating the accumulator.

Thermoforming within minutes or within about 24 hours after the foaming operation while the majority of foaming gas still remains in the polymer after foaming yields a number of advantages compared to the separate processes performed with hours or days between them. Increasing the time between the foaming and forming allows more and more gas to escape before thermoforming. For example, 0.030" thick APET saturated with 5 MPa $CO_2$ at room temperature retained 95% of the impregnated gas immediately after foaming. Twenty-four hours later it retained only 40% of the gas. In another example, C-PET, 0.028" thick saturated under the same conditions, immediately after foaming, still retained about 92% of the gas of the fully saturated sample. It retained only 17% of the gas of an unfoamed saturated sample after room temperature desorb of 24 hours. The gas is beneficial for thermoforming since it lowers the $T_g$, and increases the formability of the polymer. For example, advantages of this new method include the following:

1. Saving energy and speeding up the thermoforming process by not cooling the polymer to "quench" the bubble growth as described in U.S. Pat. No. 5,684,055. Rather, immediately after most (70-98%) of the foaming has completed (typically after 30 to 75 seconds of applied foaming heat for an approximately 0.1" thick foam), the mostly foamed sheet is fed into a thermoformer and heating is continued to a typical thermoforming temperature significantly above the $T_g$ for a few seconds. This saves energy and speeds up the combined process since the time required for cooling and a later reheating in the thermoformer is eliminated. If most of the foaming were to take place in the thermoformer, the cycle rate of the thermoformer and production rate would be greatly slowed due to the required foaming time of 30 or more seconds (2 cpm). Thus by allowing most or essentially all of the foaming to take place in a heating system separate from the thermoformer, the thermoformer cycle rate is greatly increased (30 CPM is typical). Thus a higher article production rate is obtainable by creating most of the foam prior to the thermoforming operation.

2. Improved part detail due to the combined thermoforming-foaming operation. This combined operation allows a small percentage of the foaming (2% to 30%) to take place during contact with the thermoforming die which will create better detail by filling in the die details.

3. Shortening the cycle time and saving energy to reach a given level of crystallization after thermoforming by allowing a higher percentage of polymer crystallization going into the thermoformer. If a significant time is allowed to pass (more than a day) before thermoforming the foam strip or sheet into a product, then significant amounts of $CO_2$ gas will have left the foam. By thermoforming within minutes or hours after foaming, the remainder $CO_2$ acts as a lubricant between polymer chains and increases the formability of the polymer so a higher percentage of crystallinity is allowed going into the thermoformer without cracking problems during the foaming operation. The holding time in the thermoformer to reach a given finished crystallinity level is reduced by being able to start at a higher crystallinity level without part cracking during thermoforming.

4. Shortening the cycle time and saving energy to reach a given level of crystallization after thermoforming. If a significant time is allowed to pass (more than many minutes) before thermoforming the foam strip or sheet into a product then significant amounts of $CO_2$ gas will have left the foam. By thermoforming within minutes after foaming, the remainder $CO_2$ acts as a lubricant between polymer chains and increases the propensity of the polymer toward forming crystalline structures during the heating and foaming operations. The holding time in the thermoformer to reach a given finished crystallinity level is thus reduced.
5. The plastic's lower strength due to the impregnated gas improves the die trim operation, reducing the need for added trim or trim-die heat.
6. It allows optimization of crystallinity levels in a bi-crystallinity level structure in foamed and thermoformed parts. The levels are optimized so that a) the surface crystallinity level is above a threshold level that significantly raises the part's strength and useable service temperature, and (b) the core's crystallinity level is just below a threshold level where brittleness sharply increases. The foam core after thermoforming includes a significant central layer of low crystallinity level material with high impact properties compared to the highly crystalized outer layers. The resultant parts will have increased ductility and impact resistance due to the flexible core for a given allowable service temperature.

Figure 8:
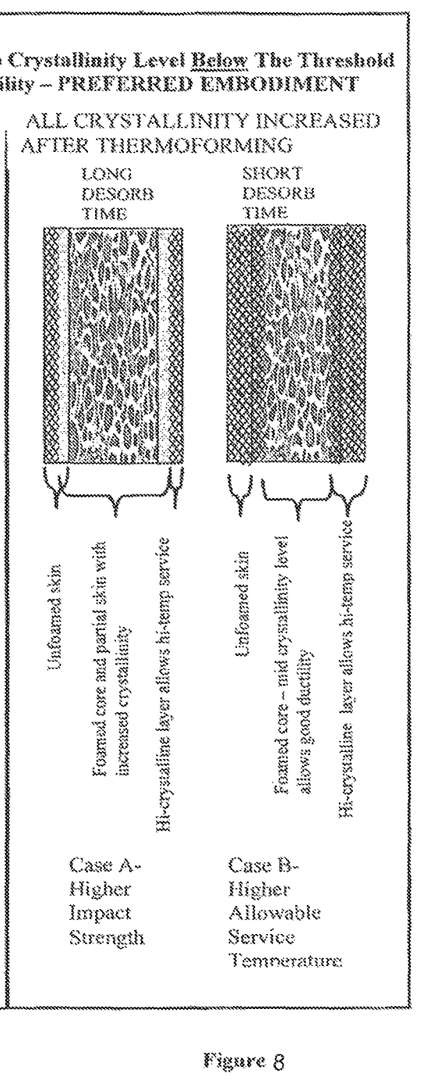

Further distinguishing characteristics of this invention, particularly when compared to the product of the U.S. Pat. No. 5,182,307, include the following:
1. The thickness of the unfoamed skin is independent of the depth from the surface of high crystallinity level material as illustrated in FIG. 8.
2. The crystallinity level of the core layer after thermoforming is not that of the unfoamed material, but is significantly higher while still much lower than the high level surface material.
3. The low-crystallinity core layer thickness is independent of the thickness of foamed center material.
4. The material may be any semicrystalline polymer foamed with a gas that acts as a solvent for the polymer and lower the glass-transition temperature ($T_g$) of the polymer such as polypropylene with $CO_2$ gas or PET with $CO_2$ gas or Polystyrene with N2.

For purposes of illustration and not limitation, the following Examples more specifically disclose exemplary method steps and actual experimental results associated with the making and testing of various deep drawn microcellularly foamed containers in accordance with the present invention. In particular, various deep draw microcellularly foamed polymeric containers similar to the one depicted in FIGS. 2A-C were successfully thermoformed, successfully thermoformed to have a width to depth ratio of greater than about 1:1 and an area draw ratio of greater than about 1.5.

EXAMPLES

Example 1 Trials

In each of the following Examples, 0.762 mm thick virgin PET was saturated with CO2 at 4 MPa pressure for 67.25 hours at 21 deg. C. Within 10 minutes after depressurization, the saturated material was foamed at 100 deg. C., yielding foamed polymer with little or no noticeable surface skin and rough surface texture. Thermoforming ovens were held at a constant temperature (about 550 deg. C.). The temperature of plastic that was thermoformed therefore increased with duration of heating. A one-sided male mold was employed, having a 2.4 areal draw ratio, height 11.11 cm, top opening 8.636 cm, height to width ratio of 1.29, bottom diameter of 5.842 cm, average wall angle of 6.5 degrees from vertical. The degassing time after foaming was varied to observe the effect of degassing on thermoforming at different temperatures of foamed objects having no significant surface skins.

Figure 4:
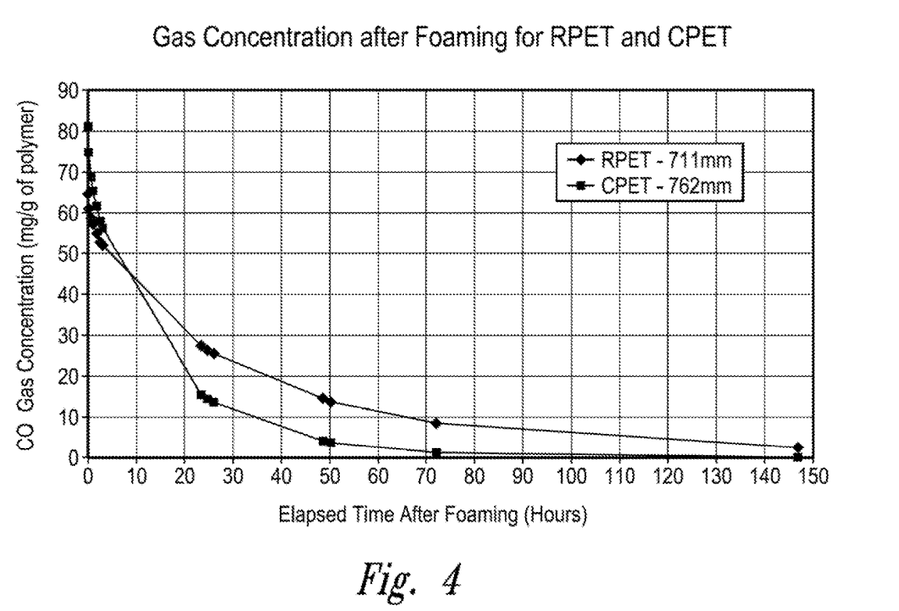
FIG. 4 is a graph illustrating CO2 gas concentration over time elapsed since foaming in polymer foamed by the solid state process (i.e., desorption time associated with the various Examples disclosed herein).

As the elapsed degassing time after foaming increases prior to thermoforming, the gas concentration in the polymer decreases, as illustrated in FIG. 4.

Trials with 10-19 minutes degas time after foaming:
Forming pressure: 0.31 MPa. Secondary expansion in thermoform observed in all trials.
Trial 1: 0.7 sec. heat time: foam broke through, no cup.
Trial 2: 10 sec. heat time: formed cup, some creases, good mold detail definition. Trial 3: 15 sec. heat time: blisters and bubbling—not enough skin to keep contain secondary expansion of bubbles.

Trials with 2.5 hrs degas time after foaming:
Forming pressure: 0.31 MPa. Secondary expansion in thermoform observed in all trials.
Trial 1: 8 sec. heat time: foam broke through, no cup indicating not enough ductility.
Trial 2: 12 sec. heat time: cup formed, good mold detail definition, some creases.

a. Trials with 23 hrs. degas time after foaming:
Forming pressure: 0.31 MPa. No secondary expansion in thermoformer noted in any trials.
Trial 1: 4 sec. heat time: cup formed, poor definition, no creases.
Trial 2: 8 sec. heat time: cup formed, poor definition, no creases.
Trial 3: 10 sec. heat time: cup formed, poor mold detail definition, no creases.

b. Trials with 51 hrs. degas time after foaming:
0.758 MPa forming pressure required for forming. No secondary expansion in thermoformer noted in any trials.
Trial 1: 4 sec. heat time: plastic pulled out of clamp frame when object reached a depth of about 5 cm.
Trial 2: 8 sec. heat time: plastic pulled out of clamp frame at full depth, partial cup.
Trial 3: 14 sec. heat time: cup partially formed, plastic clamp frame not holding plastic sheet against stretching.

Example 1 Conclusions

When thermoforming foams without thick or noticeable skin:
a. Short degas times after foaming limited heat time (foam temperature) to too low a temperature for thermoforming—longer times caused blistering;
b. The best compromise of gas concentration versus formability (ductility) was at a few hours desorb time;
c. Longer degas times decreased formability. At 51 hours, a cup could not be formed with 14 seconds of heat time due to low ductility, even at 110 psi forming pressure, where at 23 hrs degas time, a cup was made with four seconds of heat time at 45 psi pressure;
d. Secondary expansion in thermoformer increases detail.

Example 2 Trials

In each of the following examples, 0.762 mm thick virgin PET was saturated with CO2 at 5 MPa pressure for 26 hours at 21 deg. C. A skin of variable thickness was created by varying desorb time after depressurization prior to foaming. The saturated and partially desorbed material was foamed at 105 deg. C. for two minutes, yielding foamed polymer with a density of 21% relative to unfoamed polymer. Thermoforming ovens were held at a constant temperature (about 550 deg. C.). The temperature of plastic that was thermoformed was therefore proportional to duration of heating. A one-sided male mold was employed, having a 1.7 areal draw ratio, height 8.73 cm, top opening 7.62 cm, height to width ratio of 1.31, bottom diameter of 5.08 cm, average wall angle of 6.5 degrees from vertical.

Trial set 1: Foaming within 10-20 minutes of depressurization: Thermoforming was attempted within ten minutes of foaming. The cups would not form adequately with 10-15 sec. heat time. Increasing the heating time caused the cups to warp and blister. These cups failed through tearing of the plastic during attempt to form. Skin did not form that was obvious to naked eye.

Trial set 2: Desorb prior to foaming of 1.5 hours. A smooth glossy skin observed on foamed material. All cups had 2.1 areal draw ratio.
   a. Degassed 38 min after foaming. 9 sec. thermoforming heat time: cup with good surface detail. Clamp frame held plastic.
   b. Degassed 19 hrs, 50 min after foaming, 10 sec. thermoforming heat time: cup poorly defined; Plastic slipped out of clamp frame.
   c. Degassed 99 hrs, 30 minutes after foaming, over 30 seconds thermoforming heat time: poor cup definition. Clamp frame could not hold plastic against higher stiffness of plastic.
   d. Degassed 135 hours after foaming, over 30 seconds thermoforming heat time: very poor cup definition. Clamp frame could not hold plastic against higher stiffness of plastic.
   e. Degassed 135 hours after foaming, 40 seconds thermoforming heat time: cup foam walls melted through creating a spider web effect. No useful result.

Example 2 Conclusions a. Longer degas time required higher temperatures for forming objects.
b. With more than 6.0-7.0% gas concentration, a significant increase m formability was noted, allowing deeper draws.
c. With gas concentration around 0.5% by weight, little ductility is imparted to PET.

Example 3 Trials

A number of trials were conducted with 0.889 mm thick recycled PET that was saturated with CO2 at 5 MPa pressure for 40 hours at 21 deg. C. In order to form a noticeable skin, the polymer was depressurized and allowed to desorb CO2 for approximately 390 minutes. Then it was foamed for various times of 10 to 30 seconds in infrared heaters at 550 deg. C. and immediately thermoformed thereafter. A one-sided female mold was employed with a plug assist, having a 1.97 areal draw ratio, height 11.11 cm, top opening 8.26 cm, height to width ratio of 1.31, bottom diameter of 5.72 cm, average wall angle of 7.0 degrees from vertical. The relative density of the resulting foamed objects averaged 20% relative to the unfoamed polymer.

Example 3 Conclusion

Continuous processing from foaming to thermoforming is possible using gas impregnated polymer, resulting in objects of relatively low density, having steep walls and height to width ratios over 1:1.

Comparing Example 1 to Examples 2 and 3, it is clear that solid integral skin adds strength, thereby allowing deeper draws, and contains secondary expansion, thereby inhibiting blister formation even at higher gas concentrations. Integral skin allows use of open one sided tooling rather than the closed tooling commonly employed in prior art foam thermoforming.

Figures 2A, 2B, 2C, 3:
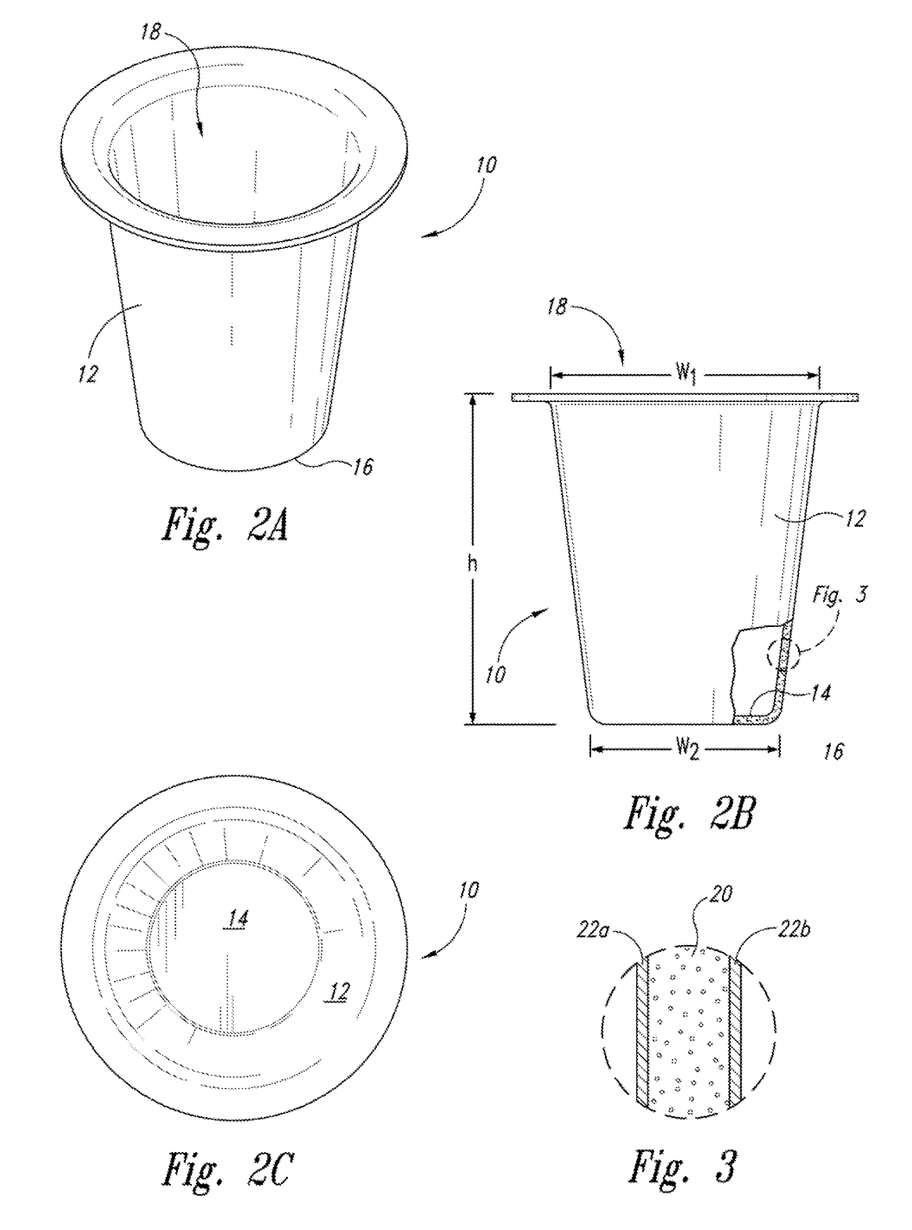
FIG. 2A is an enlarged and elevated side perspective view of a deep drawn microcellularly foamed polymeric container made in the manner as illustrated in FIG. 1.
FIG. 2B is an enlarged side perspective view of the deep drawn microcellularly foamed polymeric container illustrated in FIG. 2A, but having a cut-out section that shows a cross-section of the wall of the foamed container.
FIG. 2C is an enlarged top view of the deep drawn microcellularly foamed polymeric containers illustrated in FIGS. 2A-B.
FIG. 3 is an enlarged side view of a wall portion of the deep drawn microcellularly foamed polymeric container shown in FIG. 2B.

In view of these Examples, it is clear that the present invention encompasses various deep drawn microcellularly foamed containers. For example, and based on the data and results of these Examples and as shown in FIGS. 2A-C and 3, the present invention in one embodiment is directed to a deep drawn microcellularly foamed polymeric container 10 comprising a polymeric sidewall 12 integrally connected to a polymeric base 14 along a bottom edge 16. The polymeric sidewall 12 and base 14 are contiguous with each other and define a shape of an open top container. The polymeric sidewall 12 and base 14 have a contiguous inner microcellular foam structure 20 (having average cell diameters ranging from about 5 to about 100 microns) surrounded by a smooth outer skin layer 22a, 22b integrally connected therewith (as best shown in FIG. 3). The polymeric sidewall 12 defines a container height h and a top opening 18, wherein the top opening 18 defines a top opening width w1, and wherein the polymeric base 14 defines a container base width w2, and wherein the area defined by the top opening 18 is greater than the area defined by the polymeric base 14, and wherein the ratio of the container height (h) to the top opening width (w1) is greater than about 1:1 (h:w1). In some embodiments, the polymeric sidewall 12 and base 14 comprise polyethylene terephthalate (PET). In some embodiments, the areal draw ratio defined by the shape of the open top container is greater than about 1.5.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method for forming a thermoplastic material into a desired shape, the method comprising:
   increasing the degree of crystallinity of the thermoplastic material by infusing the thermoplastic material with a gas for a period of time,
   wherein the thermoplastic material:
      includes a core arranged between independent surface layers; and
      has a threshold degree of crystallinity above which bubbles will not nucleate when the gas-infused thermoplastic material is heated to its glass-transition-temperature, and
   wherein the increase in the degree of crystallinity of the thermoplastic material results in the degree of crystallinity of each of the surface layers being greater than the degree of crystallinity of the core;
   allowing, for a period of time, some of the gas infused into the thermoplastic material to migrate out of the gas-infused thermoplastic material;
   nucleating bubbles in the gas-infused thermoplastic material from the infused gas, after the period of time for the migration of some of the infused gas out of the thermoplastic material has occurred, by heating the gas-infused thermoplastic material to a heating temperature that is at least the glass-transition-temperature of the gas-infused thermoplastic material;

holding, for a period of time, the heating temperature to cause the bubbles to grow in size, thereby forming a mostly foamed thermoplastic material in which 70-98% of foaming has completed; and thermoforming the mostly foamed thermoplastic material into the desired shape, the thermoforming comprising heating to above the glass-transition temperature after a degas time during which a concentration of the gas in the mostly foamed thermoplastic material decreases, wherein the degas time occurs at room temperature after the holding time and prior to the thermoforming, and wherein the thermoforming occurs when 40-95% of the infused gas remains in the mostly foamed thermoplastic material such that during the thermoforming, the remaining gas in the mostly foamed thermoplastic material acts as a lubricant between polymer chains of the mostly foamed thermoplastic material and increases formability of the mostly foamed thermoplastic material.

2. The method of claim 1 wherein:

the surface layers of the gas-infused thermoplastic material each have a thickness, and throughout the thickness of each of the surface layers the degree of crystallinity of the surface layers is less than the threshold degree of crystallinity of the thermoplastic material; and the period of time for the gas infused into the gas-infused thermoplastic material to migrate out of the gas-infused thermoplastic material generates a skin region on each of said surface layers, each of said skin regions having a thickness that is greater than a thickness of a respective surface layer remaining between that skin region and the core.

3. The method of claim 1 wherein:

the surface layers of the gas-infused thermoplastic material each have a thickness, and throughout the thickness of each of the surface layers the degree of crystallinity of the surface layers is less than the threshold degree of crystallinity of the thermoplastic material; and the period of time for the gas infused into the gas-infused thermoplastic material to migrate out of the gas-infused thermoplastic material generates a skin region on each of said surface layers, each of said skin regions having a thickness that is less than a thickness of a respective surface layer remaining between that skin region and the core.

4. The method of claim 1 wherein the degree of crystallinity of the core is much less than the threshold degree of crystallinity of the thermoplastic material before the thermoplastic material is heated for said nucleating.

5. The method of claim 1 wherein said thermoforming of the thermoplastic material includes increasing the degree of crystallinity of each of the surface layers.

6. The method of claim 1 wherein said thermoforming of the thermoplastic material includes increasing the degree of crystallinity of the core.

7. The method of claim 1 wherein said thermoforming of the thermoplastic material includes increasing the degree of crystallinity of each of the surface layers and the core.

8. The method of claim 1 wherein said thermoforming of the thermoplastic material includes the step of nucleating bubbles in the thermoplastic material.

9. The method of claim 1 wherein said thermoforming of the thermoplastic material occurs within 15 minutes of said nucleating the bubbles in the thermoplastic material.

10. The method of claim 1 wherein the thermoplastic material includes polyethylene terephthalate (PET).

11. The method of claim 1 wherein the threshold degree of crystallinity of the thermoplastic material is about 19%.

12. The method of claim 1 wherein the gas includes $CO_2$.

13. The method of claim 1 wherein the infusing period of time is 15 hours.

14. The method of claim 1 wherein the migration period of time is 10 minutes.

15. The method of claim 1 wherein the migration period of time is 390 minutes.

16. The method of claim 1 wherein the holding period of time is 10 seconds.

17. The method of claim 1 wherein the desired shape is that of a deep drawn cup.

18. The method of claim 1, wherein 2-30% of foaming takes place during said thermoforming, the shaped thermoplastic material in turn being fully foamed.

19. The method of claim 1 wherein the surface layers of the gas-infused thermoplastic material each have a thickness, and throughout the thickness of each of the surface layers the degree of crystallinity of the surface layers is less than the threshold degree of crystallinity of the thermoplastic material.

20. The method of claim 1 wherein the degree of crystallinity of each of the surface layers of the gas-infused thermoplastic material is less than the threshold degree of crystallinity of the thermoplastic material.

* * * * *